US012146987B2

(12) United States Patent
Zhou et al.

(10) Patent No.: US 12,146,987 B2
(45) Date of Patent: Nov. 19, 2024

(54) AIRBORNE SUPER-CONTINUUM 50-BAND HYPERSPECTRAL LIGHT DETECTION AND RANGING SYSTEM

(71) Applicant: Guilin University of Technology, Guilin (CN)

(72) Inventors: Guoqing Zhou, Guilin (CN); Xiang Zhou, Wugang (CN); Jiasheng Xu, Yongji (CN)

(73) Assignee: Guilin University of Technology, Guilin (CN)

( * ) Notice: Subject to any disclaimer, the term of this patent is extended or adjusted under 35 U.S.C. 154(b) by 832 days.

(21) Appl. No.: 17/345,799

(22) Filed: Jun. 11, 2021

(65) Prior Publication Data

US 2021/0396853 A1 Dec. 23, 2021

(30) Foreign Application Priority Data

Jun. 20, 2020 (CN) .......................... 202010570326.3

(51) Int. Cl.
*G01S 7/481* (2006.01)
*G01S 17/32* (2020.01)
*G01S 17/894* (2020.01)
*G01S 17/933* (2020.01)

(52) U.S. Cl.
CPC ............ *G01S 7/4817* (2013.01); *G01S 17/32* (2013.01); *G01S 17/894* (2020.01); *G01S 17/933* (2013.01)

(58) Field of Classification Search
CPC ...... G01S 7/4817; G01S 17/32; G01S 17/933; G01S 17/894; G01S 7/4814; G01S 7/4816; G01S 17/10; G01S 17/86; G01N 21/25
USPC ........................................................ 356/4.01
See application file for complete search history.

(56) References Cited

U.S. PATENT DOCUMENTS

| | | | |
|---|---|---|---|
| 10,794,888 B2 * | 10/2020 | Lalović | G01N 21/31 |
| 10,816,939 B1 * | 10/2020 | Coleman | G01S 17/86 |
| 2023/0090281 A1 * | 3/2023 | Kurtz | G02B 13/22 |
| | | | 359/725 |

* cited by examiner

*Primary Examiner* — Daniel L Murphy
(74) *Attorney, Agent, or Firm* — CBM PATENT CONSULTING, LLC

(57) ABSTRACT

An airborne super-continuum 50-band hyperspectral light detection and ranging system comprises an integrated control system, a storage unit, a super-continuum laser system, an optical transmitting system, a reflecting mirror, a scanning system, an optical receiving system, a super-continuum hyperspectral laser detection system, a plane array CCD camera. The operation process includes super-continuum laser system emitting continuous hyperspectral pulsed lasers, performing lasers beam expansion and collimation, emitting it to ground objects, reflecting it, receiving it by the scanning system, transmitting to the optical receiving system, and focusing it into hyperspectral laser detection system for outputting laser hyperspectrum and 3D spatial data, storing laser data in the storage unit with high-resolution multi-spectral data. The system acquires hyperspectral spectrum data with 50 bands at aspectral range of 400-900 nm, spectral resolution of 10 nm and 3D spatial data of ground objects with a ground resolution better than 0.5 meters.

2 Claims, 4 Drawing Sheets

AIRBORNE SUPER-CONTINUUM 50-BAND HYPERSPECTRAL LIGHT DETECTION AND RANGING SYSTEM

TECHNICAL FIELD

The present invention relates to the field of airborne light detection and ranging (LiDAR), and in particular to a light detection and ranging system for actively acquiring hyperspectral laser beams with 50 bands at a spectral range of 400-900 nm and a spectral resolution of 10 nm, and 3D spatial data of a ground object with a ground resolution better than 0.5 meters through all time.

BACKGROUND

Although wide spectral data of the surface of a ground object can be acquired at present using a hyperspectral imaging technology, the 3D spatial data of the ground object cannot be simultaneously acquired, especially spatial distribution data along a vertical distribution of the ground object. Light detection and ranging (LiDAR) can be used to rapidly, directly, and precisely acquire 3D spatial data of the ground object. However, the existing LiDAR imaging system usually adopts a light source that is fixed at a certain wavelength, which causes that hyperspectral data of the surface of the ground object cannot be acquired. Internationally, data fusion technology based on two types of sensors of traditional hyperspectrum and LiDAR that has been studied for many years, and an optical instrument that has been recently developed to synchronously acquire 3D spectral information of the ground object both have certain limitations. For example, the traditional hyperspectrum relies on the sun as a light source, so that hyperspectral data cannot be acquired all time, biochemical, physicochemical and action parameters of plants at night cannot be inversed, and physiological parameters of vertical distribution of the plants cannot be estimated by plant hyperspectrum and canopy data. Traditional LiDAR only can be used to acquire 3D spatial information and single-band laser reflection data of the plants, resulting in that it is difficult to precisely match the heterogeneous data acquired by the traditional hyperspectrum and the traditional LiDAR. Neither the traditional hyperspectrum nor the traditional LiDAR can be used to simultaneously acquire hyperspectral data of the vertical distribution and 3D spatial data of the plants. The patent application No. CN201510591715.3 discloses a hyperspectral LiDAR test device for a target sample and method thereof, which have disadvantage that 3D spatial data of the target sample cannot be simultaneously acquired. The patent application No. CN201810030256.5 discloses a hyperspectral imaging system based on a hyperspectral camera, a plane array camera and a POS system, which have disadvantage that 3D spatial data of a target ground object cannot be acquired. The patent application No. CN201611131238.3 discloses an airborne mapping LiDAR broom-type scanning system and scanning method thereof, which have disadvantage that laser reflection data and 3D spatial data of a ground object of single band laser can be only acquired. Therefore, in view of both the disadvantages and advantages of the traditional hyperspectrum and light detection and ranging system (LiDARs), the present invention proposes an all-time active airborne super-continuum hyperspectral light detection and ranging system with 50 bands at a spectral range of 400-900 nm.

SUMMARY

An object of the present invention is to solve the above problems, which include that all-time hyperspectral data and spatial vertical parameters of a ground object cannot be acquired by the traditional hyperspectrum relying on the solar light source; 3D spatial data and single-band light reflection data of the ground object only can be acquired by the traditional LiDAR; resulting in that it is difficult to precisely match the heterogeneous data acquired by the traditional hyperspectrum and the traditional LiDAR. The present invention provides an airborne super-continuum 50-band hyperspectral light detection and ranging system with 50 bands at a spectral range of 400-900 nm, which enables to actively acquire hyperspectrum and 3D spatial data of the ground object all time.

The airborne super-continuum 50-band hyperspectral light detection and ranging system (i.e., 50 bands at a spectral range of 400-900 nm) mainly includes three parts (mechanical structures, optical paths, and detection elements) plus operation processes. The details are described as follows.

The mechanical structures consist of 10 parts: an integrated control system and storage unit, a super-continuum laser system, an optical transmitting system, a reflecting mirror, a scanning system, an optical receiving system, a super-continuum hyperspectral laser detection system, a plane array CCD camera, a GPS and an inertial measurement unit (IMU). The integrated control system and storage unit is composed of two parts: an integrated control system and a storage unit. The integrated control system is connected with the super-continuum laser system, the scanning system, the super-continuum hyperspectral laser detection system, the plane array CCD camera, and a position and orientation system (POS) system composed of the GPS and the IMU, through a bus. The storage unit is dedicated to storing data.

The integrated control system and storage unit is composed of two parts: an integrated control system and a storage unit. The integrated control system controls the super-continuum laser system to emit continuous hyperspectral pulsed laser light. The scanning system performs zigzag scanning. The super-continuum hyperspectral laser detection system handles continuous hyperspectral pulsed laser light reflected by a ground object into laser hyperspectrum and 3D spatial data. The plane array CCD camera takes pictures to acquire high-resolution multi-spectral data, controls the POS system composed of the GPS and the IMU to acquire precise attitude information such as positioning and time information, flight velocity information, course information, pitching and rolling information, and controls a flight path and an attitude of a flight platform based on the above information and navigation information, thereby acquiring laser hyperspectral, 3D spatial and multi-spectral data of the ground object, and storing these data in the storage unit.

The super-continuum laser system is controlled by the integrated control system through the bus, and is directed at the optical transmitting system through an optical output pupil. The super-continuum laser system is used for emitting 400-900 nm continuous hyperspectral pulsed laser light. The super-continuum laser system is used for receiving commands of the integrated control system and emitting continuous hyperspectral pulsed laser light.

The optical transmitting system is directed at an optical output pupil of a laser through an optical input pupil, and transmits the continuous hyperspectral pulsed laser light to the scanning system through the reflecting mirror. The optical transmitting system adopts a reflective optical system structure and off-axis two-mirror high-order a spherical structure based on a design constraint of super-large relative aperture and miniaturization to achieve full-band imaging with no chromatic aberration and high image quality. A primary mirror is a convex hyperboloid structure, which adopts the Hindle ball null compensator inspection technology to complete an interference detection of an optical path by focus auto-collimation. A secondary mirror is quadratic aspheric surface structure, which adopts the high-precision null compensator inspection technology to complete a surface precision detection of the reflecting mirror. The role of the optical transmitting system is to perform beam expansion and collimation.

The reflecting mirror is used for receiving the continuous hyperspectral pulsed laser light emitted by the optical transmitting system and reflecting the continuous hyperspectral pulsed laser light to the scanning system. The reflecting mirror is at an angle of 45 degree with the continuous hyperspectral pulsed laser light emitted by the optical transmitting system, and is used for reflecting the continuous hyperspectral pulsed laser light.

The scanning system is composed of a scan mirror, a torque motor, a photoelectric encoder and a base. The scan mirror is two-facet symmetrical structure with natural static equilibrium characteristics, and is made of materials with high specific rigidity to reduce a moment of inertia of the scan mirror body, improve the rigidity of the scan mirror body, and achieve high-stability drive and good mirror surface shape. The scanning system is controlled by the integrated control system through the bus to rotate the torque motor, to drive the scan mirror to scan, which achieves a ground resolution better than 0.5 meters by changing the scan arc with the changing height. The scanning system adopts the zigzag scanning mode to emit the continuous hyperspectral pulsed laser light or receive the continuous hyperspectral pulsed laser light reflected by the ground object. Besides, the photoelectric encoder transmits position information of the scan mirror to the integrated control system in real time, and the integrated control system corrects rotation speed information of the scanning system when a line is scanned and adjusting a scan arc of the scan mirror to avoid error accumulation.

The optical receiving system receives the continuous hyperspectral pulsed laser light reflected by the scanning system through a primary mirror, and focus the continuous hyperspectral pulsed laser light after two reflections to the super-continuum hyperspectral laser detection system by a secondary mirror. The optical receiving system adopts a reflective optical system structure and off-axis two-mirror high-order a spherical structure based on a design constraint of super-large relative aperture and miniaturization to achieve full-band imaging with no chromatic aberration and high image quality. The primary mirror is a convex hyperboloid structure, which adopts the Hindle ball null compensator inspection technology to complete an interference detection of an optical path by focus auto-collimation. The secondary mirror is quadratic aspheric surface structure, which adopts the high-precision null compensator inspection technology to complete a surface precision detection of the reflecting mirror. The role of the optical receiving system is to receive and focus the continuous hyperspectral pulsed laser light reflected by the ground object.

The super-continuum hyperspectral laser detection system comprises an optical receiving unit, a coupled transmission fiber, a slit, a correction lens, a concave grating, incident continuous hyperspectral pulsed laser light, an optical grating, a photocathode, photoelectrons, a mesh, a focus electrode, an anode, a deflection plate, a micro pass channel (MPC), a phosphor screen, a camera, an image processing unit, a full-waveform inversion unit, a time sequence controller, a delayer, and a trigger voltage generator. The incident continuous hyperspectral pulsed laser light, the optical grating, the photocathode, the mesh, photoelectrons, the focus electrode, the anode, the deflection plate, the MPC, the phosphor screen, the camera, the image processing unit, the full-waveform inversion unit, the time sequence controller, the delayer, and the trigger voltage generator are formed into a detection unit. The optical receiving system receives the continuous hyperspectral pulsed laser light through the slit, and is connected with the coupled transmission fiber by an interface for receiving the continuous hyperspectral pulsed laser light focused by the optical receiving system and transmitting the continuous hyperspectral pulsed laser light to the coupled transmission fiber. The coupled transmission fiber receives the continuous hyperspectral pulsed laser light outputted by the optical receiving system and transmits the continuous hyperspectral pulsed laser light to the slit, and the role of the coupled transmission fiber is to transmit the continuous hyperspectral pulsed laser light. The slit is connected with the coupled transmission fiber and outputs the continuous hyperspectral pulsed laser light. The role of the slit is to output the continuous hyperspectral pulsed laser light. The correction lens is used for receiving the continuous hyperspectral pulsed laser light passed through the slit, and outputting corrected continuous hyperspectral pulsed laser light. The role of the correction lens is to correct the laser light. The concave grating is used for receiving the corrected continuous hyperspectral pulsed laser light outputted from the correction lens and reflecting it to the correction lens. The role of the concave grating is to divide a single reflecting mirror of a grating imaging component into two by combining with the correction lens, to form a compact grating dispersive splitting structure by off-centre and off-axis designs, and to output focused incident continuous hyperspectral pulsed laser light. The optical grating is used for receiving the incident continuous hyperspectral pulsed laser light corrected by the correction lens and outputting hyperspectral pulsed laser light with 50 bands and 10 nm resolution, and the role of the optical grating is to emit the hyperspectral pulsed laser light with 50 bands and 10 nm resolution. The photocathode is used for receiving the hyperspectral pulsed laser light with 50 bands emitted by the optical grating and emitting photoelectrons corresponding to the hyperspectral pulsed laser light with 50 bands at the corresponding position, and the role of the photocathode is to convert the hyperspectral pulsed laser light with 50 bands into photoelectrons arranged in the same row in the order of bands. The photoelectrons are those emitted by the photocathode and corresponding to the hyperspectral pulsed laser light with 50 bands. The mesh is used for receiving the photoelectrons arranged in the same row in the order of bands emitted by the photocathode and outputting photoelectrons arranged in the same row in the order of bands, and the role of the mesh is to unify exit angles of the photoelectrons, accelerate the photoelectrons, reduce the transit time and transit dispersion of the photoelectrons between the photocathode and the mesh, and improve the imaging capability of the camera. The focus electrode is used for receiving the photoelectrons arranged in the same row in the order of bands emitted from the mesh, and outputting focused photoelectrons arranged in the same row in the order of bands, and the role of the focus electrode is to focus the photoelectrons and ensure clear image. The anode is used for receiving the focused photoelectrons arranged in the same row in the order of bands focused by the focus electrode and outputting the focused photoelectrons arranged in the same row in the order of bands to the deflection plate, and the role of the anode is to accelerate the focused photoelectrons arranged in the same row in the order of bands so that the phosphor screen can be bombard with the focused photoelectrons and clear images can be achieved in the camera. The deflection plate is used for receiving accelerated photoelectrons arranged in the same row in the order of bands accelerated by the anode and outputting deflected photoelectrons arranged in the same row in the order of bands, and the role of the deflection plate is to deflect the photoelectrons to different positions in space, that is, different rows of photoelectrons are arranged in the vertical direction of the phosphor screen. MPC refers to microchannel pipe, which is used for receiving deflected photoelectrons arranged in the same row in the order of bands and outputting energy multiplied photoelectrons arranged in the same row in the order of bands, and the role of the MPC is to multiply the energy of the deflected photoelectrons, and to ensure that light signals are produced in the phosphor screen and a clear image is produced in the camera. The phosphor screen is used for receiving the energy multiplied photoelectrons arranged in the same row in the order of bands and generating light signals arranged in the same row in the order of bands. The brightness of the light signals represents the intensity of the pulsed laser light arranged in the order of bands reflected by the ground object, a horizontal direction represents the intensity of the pulsed laser light arranged in the order of bands reflected by the ground object, and a vertical direction represents time. The role of the phosphor screen is to generate light signals. The camera is used for receiving the light signals of the phosphor screen and outputting a laser hyperspectral image to the image processing unit, and the role of the camera is to record and output the image. The image processing unit is used for receiving the laser hyperspectral image outputted by the camera and outputting a quantitative sampled laser hyperspectral image to the full-waveform inversion unit, and the role of the image processing unit is to quantitative sample. The full-waveform inversion unit is used for receiving the quantitative sampled laser hyperspectral image from the image processing unit and outputting inverted full-waveform laser hyperspectral data, and the role of the full-waveform inversion unit is to invert the quantitative sampled laser hyperspectral image into laser hyperspectrum and 3D spatial data. The time sequence controller is used for receiving a signal from the integrated control system and outputting a required delay time to the delayer, and the role of the time sequence controller is to calculate the delay time. The delayer is used for receiving the delay time from the time sequence controller and controlling the trigger voltage generator to generate a bias voltage, and the role of the delayer is to control the trigger voltage generator to generate the bias voltage according to time information. The trigger voltage generator is used for receiving a signal from the delayer, generating the bias voltage by a deflection plate, and then generating deflection electric fields with different intensities varying with time.

The plane array CCD camera is mainly used to acquire the high-resolution multi-spectral data and to assist the application of hyperspectral light detection and ranging data, such as classification.

The optical paths mainly include an optical path of the optical transmitting system, an optical path of the scanning system and an optical path of the optical receiving system.

The optical path of the optical transmitting system adopts an off-axis two-mirror form based on a primary mirror and a secondary mirror to achieve beam expansion and collimation of the optical path. The primary mirror is used for receiving beam-expanded continuous hyperspectral pulsed laser light emitted by the super-continuum laser system as a light source, and reflecting and focusing it to the secondary mirror. The secondary mirror is used for receiving focused continuous hyperspectral pulsed laser light from the primary mirror and reflecting it into parallel continuous hyperspectral pulsed laser light for light collimation. The parallel continuous hyperspectral pulsed laser light are emitted to the reflecting mirror, and then are reflected to the scanning system.

The optical path of the scanning system adopts a receiving-emitting coaxial structure and plays a role in emitting the continuous hyperspectral pulsed laser light and receiving the continuous hyperspectral pulsed laser light reflected by the ground object. The continuous hyperspectral pulsed laser light reflected by the reflecting mirror are received by the scan mirror, and then are emitted to the surface of the ground object. The continuous hyperspectral pulsed laser light are further reflected by the ground object, is received by the scan mirror, and then is reflected to the optical receiving system.

The optical path of the optical receiving system adopts an off-axis two-mirror form based on a primary mirror and a secondary mirror to achieve focusing of the optical path. The primary mirror is used for receiving the continuous hyperspectral pulsed laser light reflected by the scanning system and emitting it to the secondary mirror. The secondary mirror is used for receiving the continuous hyperspectral pulsed laser light and then focusing it to the super-continuum hyperspectral laser detection system.

The detection elements include that, on the one hand the integrated control system sends a signal to the super-continuum laser system, and the super-continuum laser system emits the continuous hyperspectral pulsed laser light. The continuous hyperspectral pulsed laser light are subjected to beam expansion and collimation by the optical transmitting system, are reflected by the reflecting mirror, are emitted by the scanning system, and then are received by the surface of the ground object. The continuous hyperspectral pulsed laser light reflected by the ground object are received by the scanning system, are reflected to the optical receiving system, and then are received by the super-continuum hyperspectral laser detection system through the slit. In the super-continuum hyperspectral laser detection system, the continuous hyperspectral pulsed laser light are firstly received by the optical receiving unit, are transmitted to the correction lens by the coupled transmission fiber for correction, and then are focused to the correction lens by the concave grating for further correction. The corrected continuous hyperspectral pulsed laser light are received by the optical grating and then are divided into hyperspectral pulsed laser light with 50 bands and 10 nm resolution. The hyperspectral pulsed laser light with 50 bands and 10 nm resolution are irradiated to the photocathode and then photoelectrons arranged in the same row in the order of bands corresponding to the hyperspectral pulsed laser light with 50 bands are emitted at the corresponding position of the photocathode. The photoelectrons are accelerated by the mesh, the exit angles of the photoelectrons are unified, the photoelectrons are accelerated, to reduce the transit time and transit dispersion of the photoelectrons between the photocathode and the mesh. Then the photoelectrons are focused by the focus electrode, are accelerated by the anode, and are deflected by the deflection plate. On the other hand, the integrated control system sends a signal to the detection unit and controls the camera for advance exposure. The time sequence controller calculates the time and sends it to the delayer. The delayer controls the trigger voltage generator to generate a bias voltage when the photoelectrons are received by the deflection plate. Electric fields with different intensities varying with the time are generated for deflecting the received photoelectrons. The deflected photoelectrons are multiplied by the MPC, and then are bombarded on the phosphor screen to produce light signals. The camera records and transmits the laser hyperspectral image to the image processing unit for quantitative sampling, a quantitative sampled laser hyperspectral image is transmitted to the full-waveform inversion unit for inversion into full-waveform laser hyperspectrum and 3D spatial data, and the full-waveform laser hyperspectrum and 3D spatial data are ultimately transmitted to the integrated control system and are stored in the storage unit.

The operation processes of the airborne super-continuum 50-band hyperspectral light detection and ranging system (i.e., 50 bands at a spectral range of 400-900 nm) include the following steps.

(1) The integrated control system triggers a timer in the integrated control system for timing after receiving pulses per second (PPS) signal generated by the GPS.

(2) The integrated control system reads position information and UTC time received by the GPS, stores the position information and the UTC time in the storage unit, controls IMU to operate for reading attitude information of a flight platform and a time label, and stores the attitude information and the time label in the storage unit;

(3) The integrated control system sends a command by an interface, controls the super-continuum laser system to emit the continuous hyperspectral pulsed laser light, the optical transmitting system performs beam expansion and collimation of the continuous hyperspectral pulsed laser light, the reflecting mirror reflects the continuous hyperspectral pulsed laser light, the scanning system emits the continuous hyperspectral pulsed laser light to the surface of the ground object;

(4) The scanning system receives the continuous hyperspectral pulsed laser light reflected by the ground object and reflect it to the optical receiving system for focusing, the optical receiving system transmits the continuous hyperspectral pulsed laser light to the super-continuum hyperspectral laser detection system, and the timer performs timing;

(5) The super-continuum hyperspectral laser detection system transforms the received continuous hyperspectral pulsed laser light into laser hyperspectral data and 3D spatial data, and transmits the laser hyperspectral data and 3D spatial data to the integrated control system for storing in the storage unit.

(6) The integrated control system stores the laser hyperspectral data, the 3D spatial data and high-resolution multispectral data in the storage unit.

(7) Repeat the processes of (2) to (6) until a scanning operation is completed. In the operation process, the scanning system adopts a zigzag scanning mode and continually adjusts rotation positions of the scan mirror, the photoelectric encoder transmits position information of the scan mirror to the integrated control system in real time, the integrated control system corrects rotation speed information of the scanning system when a line is scanned and adjusting a scan arc of the scan mirror to achieve a ground resolution better than 0.5 meters and avoid error accumulation, and the plane array CCD camera simultaneously acquires corresponding high-resolution multispectral data.

(8) Process the data to obtain precise laser hyperspectral data with 3D spatial coordinates after the airborne super-continuum 50-band hyperspectral light detection and ranging system is landed on the ground.

The present invention includes at least the following substantial improvements and beneficial effects.

1. The present invention combines the advantages of traditional hyperspectrum and single-band LiDAR, which can acquire both hyperspectral spectrum data and 3D spatial coordinates of the ground object, and can be used to invert 3D spatial parameters of the ground object, such as 3D spatial vertical distribution of physiological parameters of plants.

2. The present invention adopts the super-continuum hyperspectral pulsed laser light to avoid using the sun as a light source, carries out a mode of all-time hyperspectral imaging (i.e., duration of the day and night), and acquires hyperspectral data of the ground object.

3. The present invention adopts one device to acquire both the hyperspectral spectrum data and the 3D spatial coordinates of the ground object at the same time, which avoids the low precision problem caused by fusing two sensor data of the traditional LiDAR and hyperspectrum, and implements a precise match of heterogeneous data acquired by hyperspectrum and LiDAR.

Other advantages, objects, and features of the present invention will be shown in part through the following descriptions, and in part will be understood by those skilled in the art from study and practice of the present invention.

Reference signs: 1: a flight platform; 2: a vibration isolation unit; 3: a stabilization platform; 4: an optical window; 5: a payload system; 501: an integrated control system and storage unit; 502: a super-continuum laser system; 503: an optical transmitting system; 504: a reflecting mirror; 505: a scanning system; 506: an optical receiving system; 507: a super-continuum hyperspectral laser detection system; 508: a plane array CCD camera; 509: an IMU; and 510: a GPS.

Figure 2:
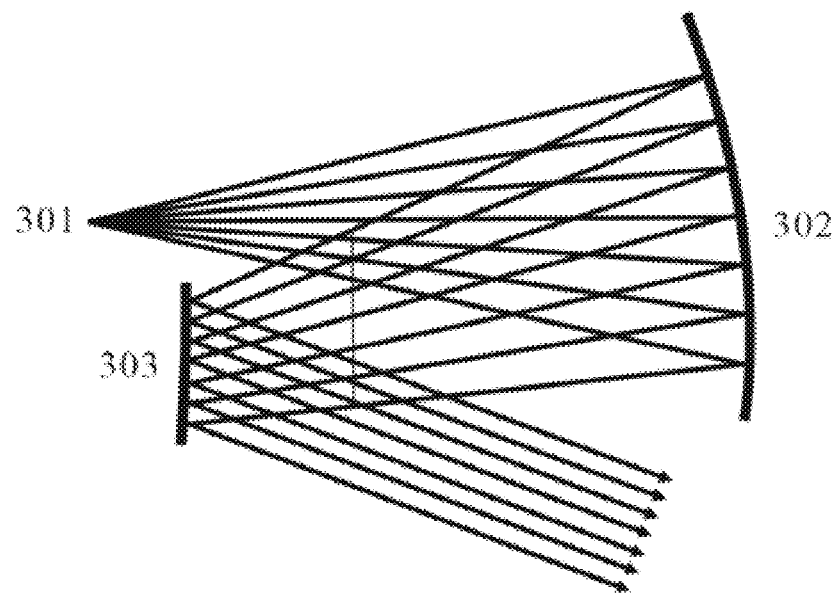

FIG. 2 is a diagram of the optical transmitting system.

Reference signs: 301: a light source; 302: a primary mirror; and 303: a secondary mirror.

Figure 3:
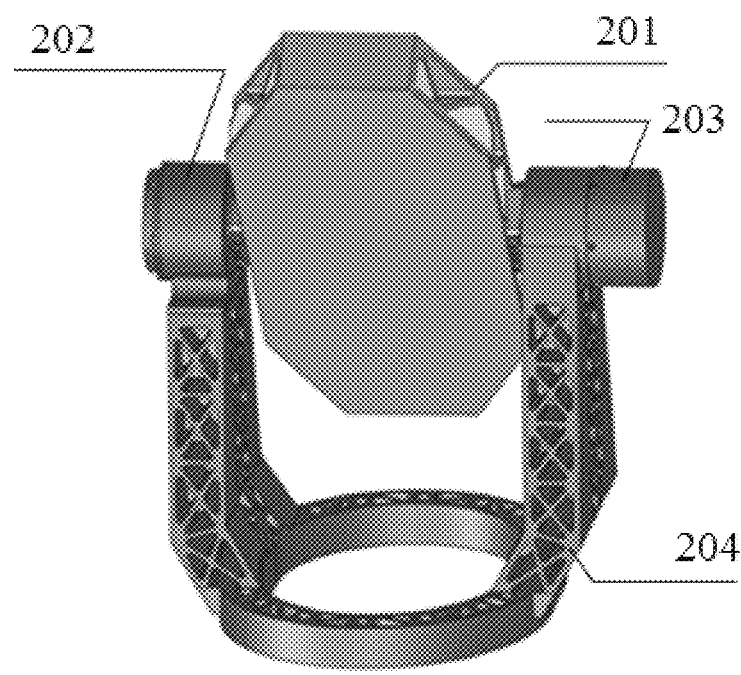

FIG. 3 is a diagram of the scanning system.

Reference signs: 201: a scan mirror; 202: a torque motor; 203: a photoelectric encoder; and 204: a base.

Figure 4:
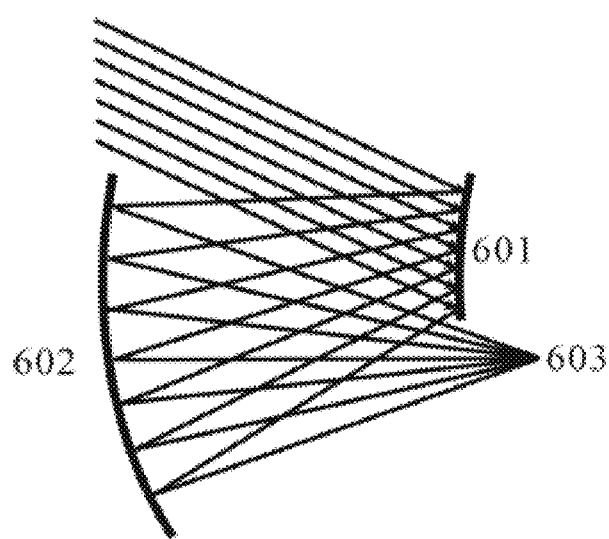

FIG. 4 is a diagram of the optical receiving system.

Reference signs: 601: a primary mirror; 602: a secondary mirror; and 603: a slit.

Figure 5:
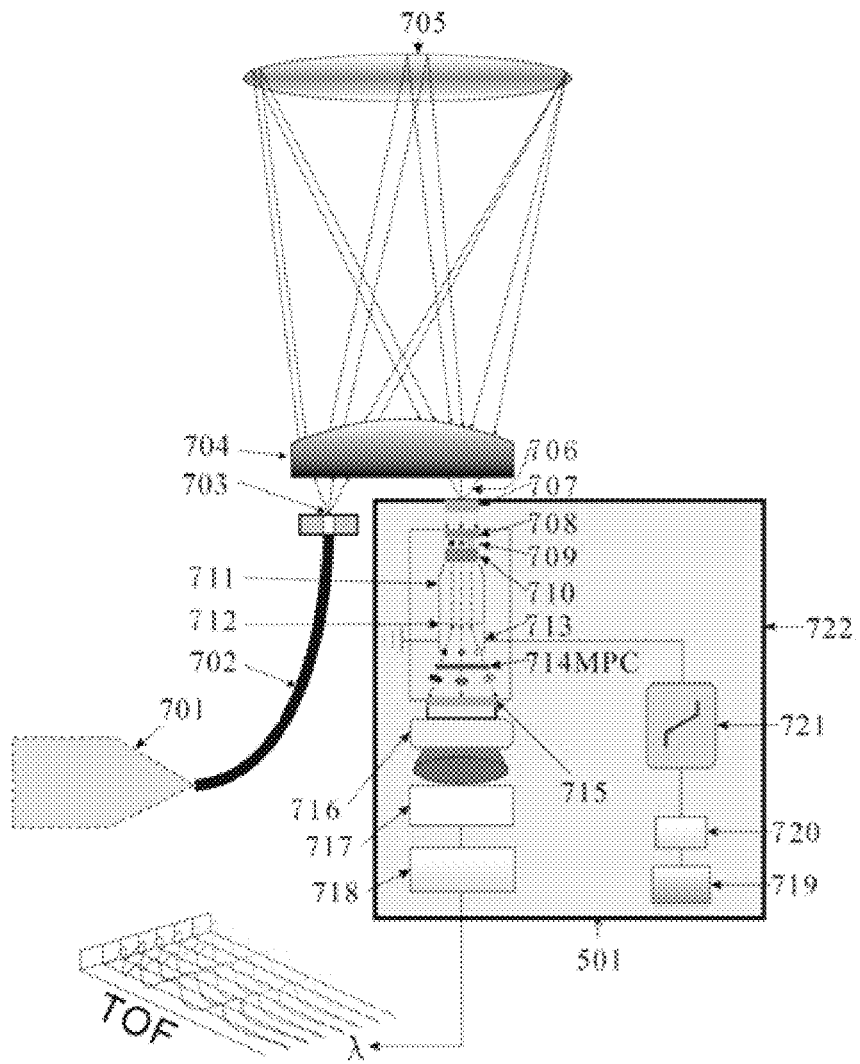

FIG. 5 is a diagram of the super-continuum hyperspectral laser detection system.

Reference signs: 701: an optical receiving unit; 702: a coupled transmission fiber; 703: a slit; 704: a correction lens; 705: a concave grating; 706: an incident continuous hyperspectral pulsed laser; 707: an optical grating; 708: a photocathode; 709: photoelectrons; 710: a mesh; 711: a focus electrode; 712: an anode; 713: a deflection plate; 714: a MPC; 715: a phosphor screen; 716: a camera; 717: an image processing unit; 718: a full-waveform inversion unit; 719: a time sequence controller; 720: a delayer; 721: a trigger voltage generator; and 722: a detection unit.

DETAILED DESCRIPTION

The present invention will now be described in further detail concerning the embodiments, to enable a person skilled in the field to practice regarding the literal description of the specification.

The present invention provides an airborne super-continuum 50-band hyperspectral light detection and ranging system (i.e., 50 bands at the spectral range of 400-900 nm). In an embodiment, the airborne super-continuum 50-band hyperspectral light detection and ranging system includes three parts (i.e., mechanical structures, optical paths, and detection elements) and operation processes.

Figure 1:
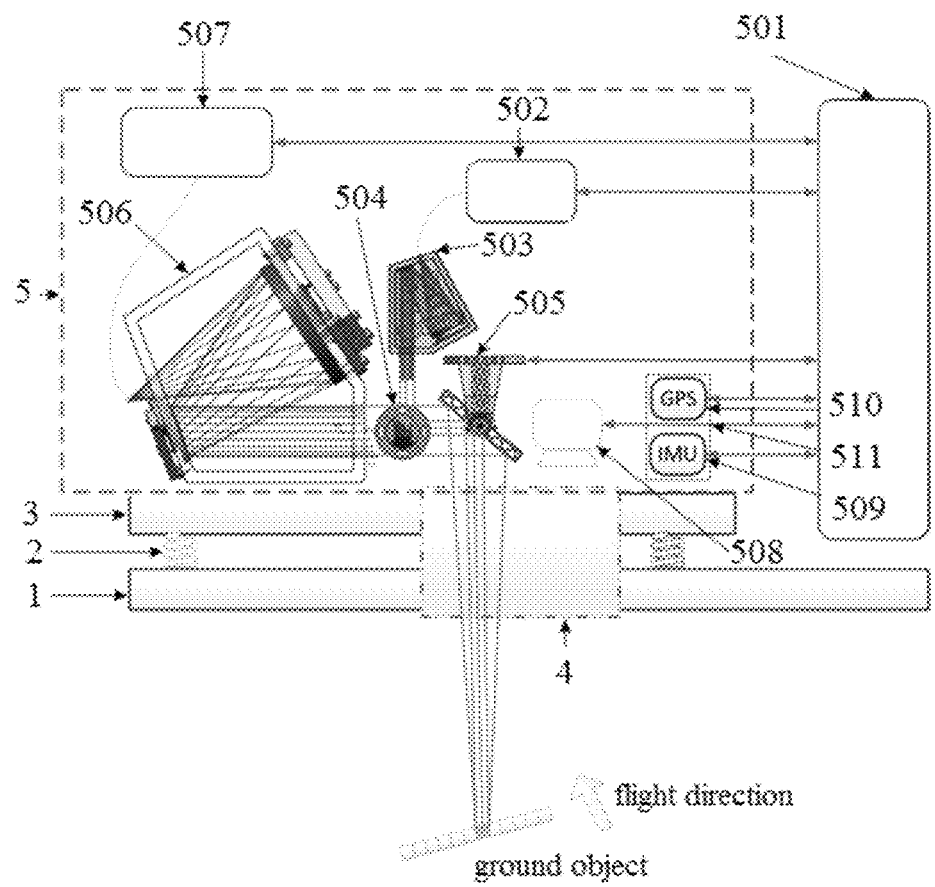
FIG. 1 is a structure principle and operation diagram of the airborne super-continuum 50-band hyperspectral light detection and ranging system.

As shown in FIG. 1, the mechanical structures comprise a flight platform 1; a vibration isolation unit 2; a stabilization platform 3; an optical window 4; and a payload system 5. The payload system 5 comprises an integrated control system and storage unit 501; a super-continuum laser system 502; an optical transmitting system 503; a reflecting mirror 504; a scanning system 505; an optical receiving system 506; a super-continuum hyperspectral laser detection system 507; a plane array CCD camera 508; an IMU 509; and a GPS 510. The integrated control system and storage unit 501 is connected with the super-continuum laser system 502, the scanning system 505, the super-continuum hyperspectral laser detection system 507, the plane array CCD camera 508, and a POS system 511 composed of the GPS 510 and the IMU 509, by a bus.

As shown in FIG. 1, the integrated control system and storage unit 501 of the mechanical structures is composed of an integrated control system and a storage unit. The integrated control system controls the super-continuum laser system 502 to emit continuous hyperspectral pulsed laser light. The scanning system 505 performs zigzag scanning. The super-continuum hyperspectral laser detection system 507 handles continuous hyperspectral pulsed laser light reflected by a ground object into laser hyperspectrum and 3D spatial data. The plane array CCD camera 508 takes pictures to acquire high-resolution multi-spectral data. The POS system 511 composed of the GPS 510 and the IMU 509 acquires precise attitude information such as position and time information, flight velocity information, course information, pitching and rolling information, and controls a flight path and an attitude of the flight platform based on the above information and navigation information, thereby acquiring laser hyperspectral, 3D spatial and multi-spectral data of the ground object, and storing these data in the storage unit.

As shown in FIG. 1, the super-continuum laser system 502 is controlled by the integrated control system through the bus, and is directed at the optical transmitting system through an optical output pupil. The super-continuum laser system is used for emitting 400-900 nm continuous hyperspectral pulsed laser light.

As shown in FIG. 2, the optical transmitting system 503 comprises a light source 301 using the super-continuum laser system 502 as the light source, a primary mirror 302 and a secondary mirror 303. The optical transmitting system adopts a double-reflective optical path to realize beam expansion and collimation for the continuous hyperspectral pulsed laser light emitted by the super-continuum laser system 502.

As shown in FIG. 1, the reflecting mirror 504 is a full-band reflecting mirror, which is mainly used for reflecting the continuous hyperspectral pulsed laser light.

As shown in FIG. 3, the scanning system 505 can implement receiving-emitting coaxial zigzag scanning and receiving by one scanning system. The scanning system comprises a scan mirror 201, a torque motor 202, a photoelectric encoder 203 and a base 204. The integrated control system controls the scanning system 505 through the bus to rotate the torque motor, to drive the scan mirror to scan 1 mrad, which achieves a ground resolution of 0.5 meters. If a scan arc is further decreased, the ground resolution can be further better than 0.5 meters. The scanning system adopts the zigzag scanning mode to emit the continuous hyperspectral pulsed laser light or receive the continuous hyperspectral pulsed laser light reflected by the ground object. Besides, the photoelectric encoder transmits position information of the scan mirror to the integrated control system in real time, and the integrated control system corrects rotation speed information of the scanning system when a line is scanned and adjusts a scan arc of the scan mirror to avoid error accumulation.

As shown in FIG. 4, the optical receiving system 506 is described, and the optical receiving system 506 mainly adopts a double-reflective optical path to receive the continuous hyperspectral pulsed laser light reflected by the scanning system, and focuses the continuous hyperspectral pulsed laser light to the super-continuum hyperspectral laser detection system.

As shown in FIG. 5, the super-continuum hyperspectral laser detection system 507 comprises an optical receiving unit 701, a coupled transmission fiber 702, a slit 703, a correction lens 704, a concave grating 705, incident continuous hyperspectral pulsed laser light 706, an optical grating 707, a photocathode 708, photoelectrons 709, a mesh 710, a focus electrode 711, an anode 712, a deflection plate 713, a MPC 714, a phosphor screen 715, a camera 716, an image processing unit 717, a full-waveform inversion unit 718, a time sequence controller 719, a delayer 720, and a trigger voltage generator 721. The incident continuous hyperspectral pulsed laser light 706, the optical grating 707, the photocathode 708, the photoelectrons 709, the mesh 710, the focus electrode 711, the anode 712, the deflection plate 713, the MPC 714, the phosphor screen 715, the camera 716, the image processing unit 717, the full-waveform inversion unit 718, the time sequence controller 719, the delayer 720, and the trigger voltage generator 721 are formed into a detection unit 722. The optical receiving unit 701 receives the continuous hyperspectral pulsed laser light through the slit 703, and is connected with the coupled transmission fiber 702 by an interface for receiving the continuous hyperspectral pulsed laser light focused by the optical receiving system and transmitting the continuous hyperspectral pulsed laser light to the coupled transmission fiber. The coupled transmission fiber 702 receives the continuous hyperspectral pulsed laser light outputted by the optical receiving unit 701 and transmits the continuous hyperspectral pulsed laser light to the slit 703, and the role of the coupled transmission fiber 702 is to transmit the continuous hyperspectral pulsed laser light. The slit 703 is connected with the coupled transmission fiber 702 and outputs the continuous hyperspectral pulsed laser light. The role of the slit is to output the continuous hyperspectral pulsed laser light. The correction lens 704 is used for receiving the continuous hyperspectral pulsed laser light passed through the slit 703 and outputting corrected continuous hyperspectral pulsed laser light. The role of the correction lens 704 is to correct the laser light.

The concave grating 705 is used for receiving the corrected continuous hyperspectral pulsed laser light outputted from the correction lens 704 and reflecting it to the correction lens 704. The role of the concave grating is to divide a single reflecting mirror of a grating imaging component into two by combining with the correction lens 704, to form a compact grating dispersive splitting structure by off-centre and off-axis designs, and to output focused incident continuous hyperspectral pulsed laser light 706. The optical grating 707 is used for receiving the incident continuous hyperspectral pulsed laser light 706 corrected by the correction lens and outputting hyperspectral pulsed laser light with 50 bands and 10 nm resolution, and the role of the optical grating is to emit the hyperspectral pulsed laser light with 50 bands and 10 nm resolution. The photocathode 708 is used for receiving the hyperspectral pulsed laser light with 50 bands emitted by the optical grating 707 and emitting photoelectrons corresponding to the hyperspectral pulsed laser light with 50 bands at corresponding positions, and the role of the photocathode is to convert the hyperspectral pulsed laser light with 50 bands into photoelectrons arranged in the same row in the order of bands. The photoelectrons 709 are those emitted by the photocathode 708 and corresponding to the hyperspectral pulsed laser light with 50 bands. The mesh 710 is used for receiving the photoelectrons 709 arranged in the same row in the order of bands emitted by the photocathode 708 and outputting photoelectrons 709 arranged in the same row in the order of bands, and the role of the mesh is to unify exit angles of the photoelectrons, accelerate the photoelectrons, reduce the transit time and transit dispersion of the photoelectrons between the photocathode 708 and the mesh 710, and improve imaging capability of the camera. The focus electrode 711 is used for receiving the photoelectrons 709 arranged in the same row in the order of bands emitted from the mesh 710, and outputting focused photoelectrons 709 arranged in the same row in the order of bands, and the role of the focus electrode is to focus the photoelectrons and ensure clear image. The anode 712 is used for receiving the focused photoelectrons 709 arranged in the same row in the order of bands focused by the focus electrode 711 and outputting the focused photoelectrons arranged in the same row in the order of bands to the deflection plate 713, and the role of the anode is to accelerate the focused photoelectrons arranged in the same row in the order of bands so that the phosphor screen can be bombard with the focused photoelectrons and clear images can be achieved in the camera. The deflection plate 713 is used for receiving accelerated photoelectrons 709 arranged in the same row in the order of bands accelerated by the anode 712 and outputting deflected photoelectrons 709 arranged in the same row in the order of bands, and the role of the deflection plate is to deflect the photoelectrons to different positions in space, that is, different rows of the photoelectrons are arranged in the vertical direction of the phosphor screen. MPC 714 refers to a microchannel pipe, which is used for receiving the deflected photoelectrons 709 arranged in the same row in the order of bands and outputting energy multiplied photoelectrons 709 arranged in the same row in the order of bands, and the role of the MPC is to multiply the energy of the deflected photoelectrons, and to ensure that light signals are produced in the phosphor screen and a clear image is produced in the camera. The phosphor screen 715 is used for receiving the energy multiplied photoelectrons 709 arranged in the same row in the order of bands and generating light signals arranged in the same row in the order of bands. The brightness of the light signals represents the intensity of pulsed laser light arranged in the order of bands reflected by the ground object, a horizontal direction represents the intensity of the pulsed laser light arranged in the order of bands reflected by the ground object, and a vertical direction represents time. The role of the phosphor screen is to generate light signals. The camera 716 is used for receiving the light signals of the phosphor screen 715 and outputting a laser hyperspectral image to the image processing unit 717, and the role of the camera is to record and output an image. The image processing unit 717 is used for receiving the laser hyperspectral image outputted by the camera 716 and outputting a quantitative sampled laser hyperspectral image to the full-waveform inversion unit 718, and the role of the image processing unit is to quantitative sample. The full-waveform inversion unit 718 is used for receiving the quantitative sampled laser hyperspectral image from the image processing unit and outputting inverted full-waveform laser hyperspectral data, and the role of the full-waveform inversion unit is to invert the quantitative sampled laser hyperspectral image into laser hyperspectrum and 3D spatial data. The time sequence controller 719 is used for receiving a signal from the integrated control system and outputting a required delay time to the delayer 720, and the role of the time sequence controller is to calculate the delay time. The delayer 720 is used for receiving the delay time from the time sequence controller 719 and controlling the trigger voltage generator 721 to generate a bias voltage, and the role of the delayer is to control the trigger voltage generator to generate the bias voltage according to time information. The trigger voltage generator 721 is used for receiving a signal from the delayer 720, generating the bias voltage by a deflection plate 713, and then generating deflection electric fields with different intensities varying with time.

The plane array CCD camera 508 is mainly used to acquire the high-resolution multi-spectral data and to assist the data application of hyperspectral light detection and ranging, such as accuracy verification of classification.

The optical paths mainly include an optical path of the optical transmitting system, an optical path of the scanning system and an optical path of the optical receiving system.

As shown in FIG. 1 and FIG. 2, the optical path of the optical transmitting system 503 adopts an off-axis two-mirror form based on a primary mirror 302 and a secondary mirror 303 to achieve beam expansion and collimation of the optical path. The primary mirror 302 is used for receiving beam-expanded continuous hyperspectral pulsed laser light emitted by the super-continuum laser system as a light source 301, and reflecting and focusing it to the secondary mirror 303. The secondary mirror 303 is used for receiving focused continuous hyperspectral pulsed laser light from the primary mirror 302 and reflecting it into parallel continuous hyperspectral pulsed laser light for light collimation. The parallel continuous hyperspectral pulsed laser light are emitted to the reflecting mirror 504, and then are reflected to the scanning system 505.

As shown in FIG. 1 and FIG. 3, the optical path of the scanning system 505 adopts a receiving-emitting coaxial structure and plays a role in emitting the continuous hyperspectral pulsed laser light and receiving the continuous hyperspectral pulsed laser light reflected by the ground object. The continuous hyperspectral pulsed laser light reflected by the reflecting mirror 504 are received by the scan mirror 201, and then are emitted to the surface of the ground object. The continuous hyperspectral pulsed laser light are further reflected by the ground object, is received by the scan mirror 201, and then is reflected to the optical receiving system 506.

As shown in FIG. 1 and FIG. 4, the optical path of the optical receiving system 506 adopts an off-axis two-mirror form based on a primary mirror 601 and a secondary mirror 602 to achieve focusing of the optical path. The primary mirror 601 is used for receiving the continuous hyperspectral pulsed laser light reflected by the scanning system and emitting it to the secondary mirror 602. The secondary mirror is used for receiving the continuous hyperspectral pulsed laser light and then focusing it to the super-continuum hyperspectral laser detection system 507.

As shown in FIG. 1 and FIG. 5, the detection unit 723 of the super-continuum hyperspectral laser detection system 507 is described below, i.e., its detection principle is as follow.

On the one hand, the integrated control system 501 sends a signal to the super-continuum laser system 502, and the super-continuum laser system 502 emits the continuous hyperspectral pulsed laser light. The continuous hyperspectral pulsed laser light are subjected to beam expansion and collimation by the optical transmitting system 503, are reflected by the reflecting mirror 504, are emitted by the scanning system 505, and then are received by the surface of the ground object. The continuous hyperspectral pulsed laser light reflected by the ground object are received by the scanning system 505, are reflected to the optical receiving system 506, and then are received by the super-continuum hyperspectral laser detection system 507 through the slit. In the super-continuum hyperspectral laser detection system 507, the continuous hyperspectral pulsed laser light are firstly received by the optical receiving unit 701, are transmitted to the correction lens 704 by the coupled transmission fiber 702 for correction, and then are focused to the correction lens 704 by the concave grating 705 for further correction. The corrected continuous hyperspectral pulsed laser light are received by the optical grating 707 and then are divided into hyperspectral pulsed laser light with 50 bands and 10 nm resolution. The hyperspectral pulsed laser light with 50 bands and 10 nm resolution are irradiated to the photocathode 708 and then photoelectrons 709 arranged in the same row in the order of bands corresponding to the hyperspectral pulsed laser light with 50 bands are emitted at the corresponding positions of the photocathode. The photoelectrons are accelerated by the mesh 710 and the exit angles of the photoelectrons are unified, the photoelectrons are accelerated, to reduce the transit time and transit dispersion of the photoelectrons between the photocathode and the mesh. Then the photoelectrons are focused by the focus electrode 711, are accelerated by the anode 712, and are deflected by the deflection plate 713. On the other hand, the integrated control system 501 sends a signal to the detection unit 722 and controls the camera 716 for advance exposure. The time sequence controller 719 calculates the delay time and sends it to the delayer 720. The delayer 720 controls the trigger voltage generator 721 to generate a bias voltage when the photoelectrons 709 are received by the deflection plate 713. Electric fields with different intensities varying with time are generated for deflecting the received photoelectrons. The deflected photoelectrons are multiplied by the MPC 714, and then are bombarded on the phosphor screen 715 to produce light signals. The camera 716 records and transmits a laser hyperspectral image to the image processing unit 717 for quantitative sampling, a quantitative sampled laser hyperspectral image is transmitted to the full-waveform inversion unit 718 for inversion into full-waveform laser hyperspectrum and 3D spatial data, and the full-waveform laser hyperspectrum and 3D spatial data are ultimately transmitted to the integrated control system 501 and are stored in the storage unit.

As shown in FIG. 1, the operation process is as follows. The airborne super-continuum 50-band hyperspectral light detection and ranging system (i.e., 50 bands at the spectral range of 400-900 nm) can be installed on a 100 m flying-height aircraft for the collection of hyperspectral data and 3D spatial data. A target area of 1×1 square meters can be detected by emitting single continuous pulsed laser light, which generates a three-dimensional distance having error less than 0.01 m and a pixel interval of 0.5 meters. The specific process is described as follow.

(1) The integrated control system 501 triggers a timer in the integrated control system for timing after receiving a PPS signal generated by the GPS 510.

(2) The integrated control system 501 reads the position information and the UTC time received by the GPS 510, stores the position information and the UTC time in the storage unit, controls the IMU 509 to operate for reading POS data (such as attitude information of a flight platform 1) and a time label, and stores the POS data and the time label in the storage unit 501;

(3) The integrated control system 501 sends a command by an interface (the timer performs timing), controls the super-continuum laser system 502 to emit the continuous hyperspectral pulsed laser light, the optical transmitting system 503 performs beam expansion and collimation of the continuous hyperspectral pulsed laser light, the reflecting mirror 504 reflects the continuous hyperspectral pulsed laser light, the scanning system 505 emits the continuous hyperspectral pulsed laser light to the surface of the ground object;

(4) The scanning system 505 receives the continuous hyperspectral pulsed laser light reflected by the ground object and reflect it to the optical receiving system 506 for focusing, the optical receiving system transmits the continuous hyperspectral pulsed laser light to the super-continuum hyperspectral laser detection system 507, and the timer performs timing;

(5) The super-continuum hyperspectral laser detection system transforms the received continuous hyperspectral pulsed laser light into laser hyperspectral data and 3D spatial data, and transmits the laser hyperspectral data and 3D spatial data to the integrated control system for storing in the storage unit.

(6) The integrated control system 501 stores the laser hyperspectral data, the 3D spatial data and high-resolution multispectral data in the storage unit.

(7) Repeat the steps of (2) to (6) until a scanning operation is completed. In the operation process, the scanning system 505 adopts a zigzag scanning mode and continually adjusts rotation positions of the scan mirror, the photoelectric encoder transmits position information of the scan mirror to the integrated control system in real time, the integrated control system corrects rotation speed information of the scanning system when a line is scanned and adjusting a scan arc of the scan mirror to achieve a ground resolution better than 0.5 meters and avoid error accumulation, and the plane array CCD camera simultaneously acquires corresponding high-resolution multispectral data.

(8) Process the data to obtain precise laser hyperspectral data with 3D spatial coordinates after the airborne super-continuum 50-band hyperspectral light detection and ranging system is landed on the ground.

Although the embodiments of the present invention have been disclosed above, they are not limited to the applications previously mentioned in the specification and the embodiments and can be applied in various fields suitable for the present invention. For an ordinary skilled person in the field, other changes may be easily achieved. Therefore, without departing the general concept defined by the claims and their equivalents, the present invention is not limited to particular details and embodiments shown and described herein.

What is claimed is:

1. An airborne super-continuum 50-band hyperspectral light detection and ranging system, comprising an integrated control system, a storage unit, a super-continuum laser system, an optical transmitting system, a reflecting mirror, a scanning system, an optical receiving system, a super-continuum hyperspectral laser detection system, a plane array CCD camera, a GPS and an IMU; wherein the integrated control system is configured to, through a bus, control the super-continuum laser system to emit continuous hyperspectral pulsed laser light, control the scanning system to perform zigzag scanning, control the super-continuum hyperspectral laser detection system to handle the continuous hyperspectral pulsed laser light reflected by a ground object into laser hyperspectrum and 3D spatial data, control the plane array CCD camera to take pictures to acquire multi-spectral data with high resolution, control a POS system composed of the GPS and the IMU to acquire precise position information, time information, flight velocity information, course information, pitching information and rolling information of a flight platform, and navigate the flight platform; wherein acquired laser hyperspectral data, 3D spatial data and multi-spectral data of the ground object are stored in the storage unit; wherein the airborne super-continuum 50-band hyperspectral light detection and ranging system is configured to emit 400-900 nm continuous hyperspectral pulsed laser light and simultaneously acquire the laser hyperspectral data with 10 nm spectral resolution, the 3D spatial data with ground resolution better than 0.5 meters and multi-spectral data with high resolution of the ground object; wherein the optical transmitting system is directed at an optical output pupil of the super-continuum laser system through an optical input pupil, the continuous hyperspectral pulsed laser light being transmitted to the scanning system through the reflecting mirror, the optical transmitting system adopting a reflective optical system structure and an off-axis two-mirror high-order aspherical structure based on a design constraint of super-large relative aperture and miniaturization to achieve full-band imaging with no chromatic aberration and high image quality, a primary mirror of the optical transmitting system being a convex hyperboloid structure, which adopts a Hindle ball null compensator inspection technology to implement an interference detection of an optical path by focus auto-collimation, a secondary mirror of the optical transmitting system being quadratic aspheric surface structure, which adopts a high-precision null compensator inspection technology to complete a surface shape precision detection of the reflecting mirror; wherein the reflecting mirror is at an angle of 45 degree with the continuous hyperspectral pulsed laser light emitted by the optical transmitting system, receives the continuous hyperspectral pulsed laser light emitted by the optical transmitting system and reflects the continuous hyperspectral pulsed laser light to the scanning system; wherein the scanning system comprises a scan mirror, a torque motor, a photoelectric encoder and a base; wherein the scan mirror is a two-facet symmetrical structure and is made of materials with high specific rigidity, the photoelectric encoder transmitting position information of the scan mirror to the integrated control system in real time, the integrated control system correcting rotation speed information of the scanning system when a line is scanned and adjusting a scan arc of the scan mirror to avoid error accumulation, the scanning system adopting a receiving-emitting coaxial zigzag scanning mode to emit the continuous hyperspectral pulsed laser light or receive the continuous hyperspectral pulsed laser light reflected by the ground object, the integrated control system controlling the scanning system through the bus to rotate the torque motor, to drive the scan mirror to scan, which achieves a ground resolution better than 0.5 meters by changing the scan arc with the changing height; wherein the optical receiving system receives the continuous hyperspectral pulsed laser light reflected by the scanning system through a primary mirror, and focus the continuous hyperspectral pulsed laser light after two reflections to the super-continuum hyperspectral laser detection system by a secondary mirror; wherein the super-continuum hyperspectral laser detection system comprises a optical receiving unit, a coupled transmission fiber, a slit, a correction lens, a concave grating and a detection unit, wherein the detection unit comprises an optical grating, a photocathode, a mesh, a focus electrode, an anode, a deflection plate, a MPC, a phosphor screen, a camera, an image processing unit, a full-waveform inversion unit, a time sequence controller, a delayer, and a trigger voltage generator, the super-continuum hyperspectral laser detection system receiving the continuous hyperspectral pulsed laser light transmitted by the optical receiving system through the slit, and outputting laser hyperspectral data with 10 nm spectral resolution and 3D spatial data with ground resolution better than 0.5 meters of the ground object, the detection unit acquiring spatial, temporal and spectral data of the ground object by the continuous hyperspectral pulsed laser light received by the optical grating.

2. The airborne super-continuum 50-band hyperspectral light detection and ranging system according to the claim 1, having the following operation process:
(1) the integrated control system triggering a timer in the integrated control system for timing after receiving a PPS signal generated by the GPS;
(2) the integrated control system reading position information and UTC time received by the GPS, storing the position information and the UTC time in the storage unit, controlling IMU to operate for reading attitude information of a flight platform and a time label, and storing the attitude information and the time label in the storage unit;
(3) the integrated control system sending a command by an interface, controlling the super-continuum laser system to emit the continuous hyperspectral pulsed laser light, the optical transmitting system performing beam expansion and collimation of the continuous hyperspectral pulsed laser light, the reflecting mirror reflecting the continuous hyperspectral pulsed laser light, the scanning system emitting the continuous hyperspectral pulsed laser light to the surface of the ground object;
(4) the scanning system receiving the continuous hyperspectral pulsed laser light reflected by the ground object and reflecting it to the optical receiving system for focusing, the optical receiving system transmitting the continuous hyperspectral pulsed laser light to the super-continuum hyperspectral laser detection system, and the timer performing timing;
(5) the super-continuum hyperspectral laser detection system transforming the received continuous hyperspectral pulsed laser light into laser hyperspectral data and 3D spatial data, and transmitting the laser hyperspectral data and 3D spatial data to the integrated control system for storing in the storage unit;
(6) the integrated control system storing the laser hyperspectral data, the 3D spatial data and high-resolution multispectral data in the storage unit;
(7) repeating the processes of (2) to (6) until a scanning operation is completed, and the plane array CCD camera simultaneously acquiring corresponding high-resolution multispectral data; and 3D spatial data;
(8) processing data to obtain precise laser hyperspectral data with 3D spatial coordinates after the airborne super-continuum 50-band hyperspectral light detection and ranging system is landed on the ground.

* * * * *